(12) United States Patent
Pullichola et al.

(10) Patent No.: US 8,979,957 B2
(45) Date of Patent: Mar. 17, 2015

(54) MELAMINE METHYLOL FOR ABRASIVE PRODUCTS

(75) Inventors: Abdul Habid Pullichola, Kerala (IN); Adiseshaiah K. Seshu, Clifton Park, NY (US); Kottotil Mohan Das, Bangalore (IN)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 1088 days.

(21) Appl. No.: 12/284,350

(22) Filed: Sep. 19, 2008

(65) Prior Publication Data

US 2009/0098805 A1    Apr. 16, 2009

Related U.S. Application Data

(60) Provisional application No. 60/994,830, filed on Sep. 21, 2007.

(51) Int. Cl.

| | |
|---|---|
| *C09K 3/14* | (2006.01) |
| *B24D 3/02* | (2006.01) |
| *C09C 1/68* | (2006.01) |
| *C08K 3/14* | (2006.01) |

(52) U.S. Cl.
CPC .................................. *C08K 3/14* (2013.01)
USPC ............................................... 51/298; 51/307

(58) Field of Classification Search
USPC .................................................. 51/298, 307
See application file for complete search history.

(56) References Cited

U.S. PATENT DOCUMENTS

| | | | |
|---|---|---|---|
| 2,215,380 A | * | 9/1940 | Swain et al. .................... 51/298 |
| 2,387,256 A | | 10/1945 | Groten |
| 4,072,466 A | | 2/1978 | Hermann |
| 4,191,804 A | | 3/1980 | Weber |
| 4,536,245 A | | 8/1985 | Shiau et al. |
| 4,603,191 A | | 7/1986 | Kong |
| 4,997,905 A | | 3/1991 | Druet et al. |

(Continued)

FOREIGN PATENT DOCUMENTS

| | | |
|---|---|---|
| DE | 199 39 060 A1 | 2/2001 |
| DE | 10 2004 061 144 A1 | 6/2006 |

(Continued)

OTHER PUBLICATIONS

PCT/US2008/077036, International Search Report and Written Opinion, date of mailing Dec. 3, 2008.

(Continued)

*Primary Examiner* — Shuangyi Abu Ali
(74) *Attorney, Agent, or Firm* — Joseph P. Sullivan; Abel Law Group, LLP

(57) ABSTRACT

An abrasive product includes a plurality of abrasive particles and a resin binder cured from a resin composition that includes an aqueous dispersion of melamine methylol having a melamine-to-formaldehyde molar equivalent ratio of between about 1:1 and about 1:3.2, wherein the aqueous dispersion has a pH in a range of between about 8 and about 10. The composition also includes a formaldehyde-based resins, such as a urea-formaldehyde resin or phenol-formaldehyde resin. The melamine methylol comprises between about 1 wt % and about 50 wt % of the combined weight of the formaldehyde-based resin and the melamine methylol.

27 Claims, 1 Drawing Sheet

(56) References Cited

U.S. PATENT DOCUMENTS

| | | | |
|---|---|---|---|
| 5,008,365 A | 4/1991 | Druet et al. | |
| 5,162,462 A | 11/1992 | Barthomieux et al. | |
| 6,025,015 A | 2/2000 | Landry-Coltrain et al. | |
| 6,051,646 A | 4/2000 | Nass et al. | |
| 6,441,058 B2 * | 8/2002 | Thurber et al. | 522/96 |
| 6,713,156 B1 | 3/2004 | Pauls et al. | |
| 6,723,825 B2 | 4/2004 | Zhu et al. | |
| 7,008,312 B2 | 3/2006 | Laubender et al. | |
| 2004/0115429 A1 | 6/2004 | Michl et al. | |
| 2009/0098805 A1 | 4/2009 | Pullichola et al. | |

FOREIGN PATENT DOCUMENTS

| | | |
|---|---|---|
| EP | 0 778 299 A1 | 6/1997 |
| EP | 0 913 412 A1 | 5/1999 |
| EP | 1 828 298 A2 | 9/2007 |
| JP | H0360978 A | 3/1991 |
| JP | H0559260 A | 3/1993 |
| JP | 2000-239337 A | 9/2000 |
| JP | 2001007350 A | 1/2001 |
| JP | 2002075934 | 3/2002 |
| JP | 2002219652 | 8/2002 |
| JP | 2004518543 A | 6/2004 |
| KR | 1020050006155 | 1/2005 |
| KR | 1020060127230 | 12/2006 |
| PL | 286027 A1 | 1/1992 |
| WO | 02062531 A1 | 8/2002 |
| WO | WO 02/062532 A1 | 8/2002 |
| WO | WO 03/005876 A1 | 1/2003 |
| WO | 03087256 A1 | 10/2003 |
| WO | 2005095060 A1 | 10/2005 |
| WO | WO 2006/063802 A2 | 6/2006 |
| WO | WO 2006/119982 A1 | 11/2006 |
| WO | WO 2007/060237 A1 | 5/2007 |
| WO | WO 2007/076396 A2 | 7/2007 |
| WO | 2009039386 A1 | 3/2009 |

OTHER PUBLICATIONS

PCT/US2008/077036, International Preliminary Report on Patentability, date of mailing Sep. 1, 2009.

* cited by examiner

MELAMINE METHYLOL FOR ABRASIVE PRODUCTS

RELATED APPLICATION

This application claims the benefit of U.S. Provisional Application No. 60/994,830, filed Sep. 21, 2007. The entire teachings of the above application are incorporated herein by reference.

BACKGROUND OF THE INVENTION

Formaldehyde is a common by product of urea formaldehyde and phenol formaldehyde based resin systems. Free formaldehyde commonly is released during the processing of such resin systems during formation of bonded, coated and nonwoven abrasive products, and may represent a potential health hazard.

Several types of scavengers have been employed to reduce emission of free formaldehyde from urea formaldehyde and phenol formaldehyde resins. Among known scavengers, the most common are polyacrylamide and urea. However, as typically employed, each of these scavengers cause a significant reduction in the performance characteristics of abrasive products in which they are employed.

Therefore, there exists a need for urea formaldehyde and phenol formaldehyde resins that minimize or eliminate emission of free formaldehyde without substantial reduction in performance characteristics of products in which they are incorporated.

BRIEF DESCRIPTION OF THE INVENTION

The invention is generally directed to abrasive products and curable resins employed to form abrasive products, to methods of forming abrasive products employing formaldehyde-based resin binders having low free formaldehyde, and to methods of abrading a work piece with abrasive products employing formaldehyde-based resin binders having low free formaldehyde.

In one embodiment, the invention is directed to an abrasive product that includes a plurality of abrasive particles and a resin binder cured from a resin composition that includes an aqueous dispersion of melamine methylol, having a pH in a range of between about 8 and about 10, and having a melamine-to-formaldehyde molar equivalent ratio of between about 1:1 and about 1:3.2. The resin composition also includes a formaldehyde-based resin, such as a urea- or phenol-formaldehyde resin, wherein the melamine methylol comprises between about 1 wt % and about 50 wt % of the combined weight of the formaldehyde-based resin and the melamine methylol.

In another embodiment, the invention is directed to a curable resin composition that includes an aqueous dispersion of melamine methylol, having a pH in a range of between about 8 and about 10, and having a melamine-to-formaldehyde molar equivalent ratio of between about 1:1 and about 1:3.2. The curable resin composition also includes a formaldehyde-based resin, wherein the melamine methylol comprises between about 1 wt % and about 50 wt % of the combined weight of the formaldehyde-based resin and the melamine methylol.

A method of preparing a curable resin composition that includes an aqueous dispersion of melamine methylol, having a pH in a range of between about 8 and about 10, and having a melamine-to-formaldehyde molar equivalent ratio of between about 1:1 and about 1:3.2, is also included in the invention. The method includes mixing the aqueous dispersion of melamine methylol with a formaldehyde-based resin, wherein the melamine methylol comprises between about 1 wt % and about 50 wt % of the combined weight of the formaldehyde-based resin and the melamine methylol.

A further embodiment of the invention is directed to a method of preparing an abrasive product, comprising contacting a plurality of abrasive particles with a curable resin. The curable resin includes an aqueous dispersion of melamine methylol, having a pH in a range of between about 8 and about 10, and having a melamine-to-formaldehyde molar equivalent ratio of between about 1:1 and about 1:3.2. The curable resin composition also includes a formaldehyde-based resin, wherein the melamine methylol comprises between about 1 wt % and about 50 wt % of the combined weight of the formaldehyde-based resin and the melamine methylol. The curable composition is then cured to produce the abrasive product.

In still another embodiment, the invention is directed to a method of abrading a work surface, comprising applying an abrasive product to a work surface in an abrading motion to remove a portion of the work surface. The abrasive product includes a plurality of abrasive particles, and a resin binder. The resin binder is cured from a resin composition that includes an aqueous dispersion of melamine methylol, having a pH in a range of between about 8 and about 10, and having a melamine-to-formaldehyde molar equivalent ratio of between about 1:1 and about 1:3.2. The resin composition also includes a formaldehyde-based resin, wherein the melamine methylol comprises between about 1 wt % and about 50 wt % of the total weight of the formaldehyde-based resin and the melamine methylol.

The present invention has many advantages. For example, employing a resin composition, which includes a formaldehyde-based resin and the melamine methylol described above, can significantly reduce the amount of free formaldehyde available to be released during processing of the resin composition. Further, the reduction of free formaldehyde can occur in formaldehyde-based resins, such as urea-formaldehyde resins and phenol-formaldehyde resins, obtained by curing the resin composition. In addition, reduction of free formaldehyde typically can occur without significant diminishment of performance in abrasive products incorporating a resin binder cured from the resin composition.

DETAILED DESCRIPTION OF THE INVENTION

Figure 1:
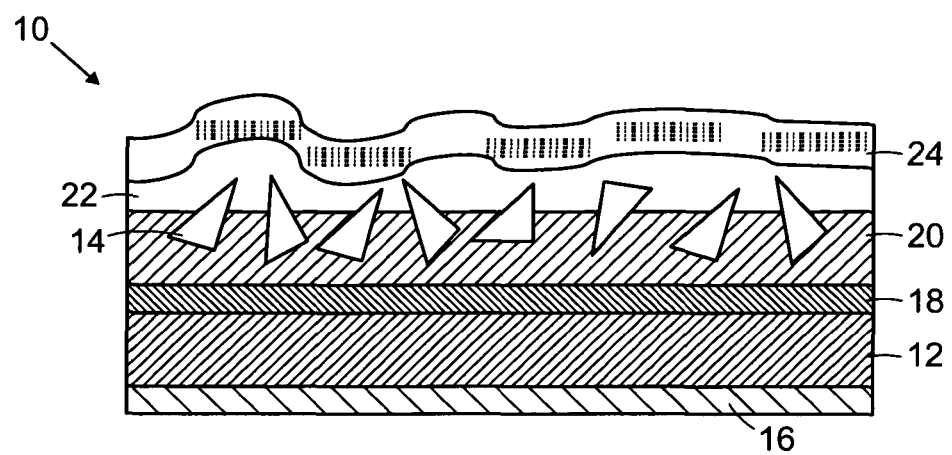
FIG. 1 is a schematic representation of a cross-sectional view of one embodiment of a coated abrasive product of the invention.

The foregoing will be apparent from the following more particular description of example embodiments of the invention.

The present invention employs an aqueous dispersion of melamine methylol, having a pH between about 8 and about 10 (e.g., a pH between about 8.5 and about 10), and having a melamine-to-formaldehyde molar equivalent ratio of between about 1:1 and about 1:3.2. The melamine methylol is relatively stable with improved hydrolytic and thermal properties. Conventional melamine-formaldehyde resins known in the art are generally made from melamine and formaldehyde through a two stage reaction, i.e., formation of methylol (—CH₂—OH) groups, and condensation reactions (or polymerization reactions) of the methylol groups. Typically, the condensation reactions of the methylol groups of one melamine unit with amine (—NH₂) groups or with methylol groups of another melamine unit occur at an acidic or a neutral condition in the presence of a catalyst. Condensation between methyol groups of one melamine unit and amine groups of another melamine unit form methylene bridges (—CH₂—) linking the two different melamine units. Condensation between methylol groups of one melamine unit and methylol groups of another melamine unit from dimethylene ether briages (—CH₂—O—CH₂—) linking the two different melamine units. Unlike such conventional melamine-formaldehyde resins, the melamine methylol employed in the invention is prepared by mixing melamine and formaldehyde in a basic condition (e.g., pH 8.5-10) without employing any catalyst, or an acidic or a neutral condition, employed in the conventional melamine-formaldehyde resins for the condensation reaction. The melamine methylol formed from the reaction between melamine and formaldehyde is then kept in a basic aqueous medium having a pH of between about 8 and about 10 for subsequent use, e.g., preparing a resin composition that includes a formaldehyde-based resin and the melamine methylol. Without being bound to any particular theory, the basic medium prevents extensive condensation reactions that typically occur in conventional melamine-formaldehyde resins. Also, without being bound to any particular theory, it is believed that, in the melamine methylol employed in the invention, the methylol groups that have not gone through condensation reaction are thus available for scavenging of free formaldehyde in formaldehyde-based resins, such as urea-formaldehyde and phenol-formaldehyde resins.

In one embodiment, the melamine methylol aqueous dispersion includes at least about 10 wt % free melamine methylol and low-condensed melamine methylol on the basis of the total weight of the melamine and formaldehyde used to make the melamine methylol dispersion. "Free" melamine methylol means a melamine-formaldehyde product that is not linked to another melamine-formaldehyde product. Free melamine methylol encompasses compounds represented by the following structural formula:

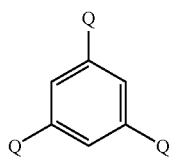

wherein each Q is independently —NH₂, —NH—CH₂OH or —N(CH₂OH)₂ and at least one of the three Qs is either —NH—CH₂OH or —N(CH₂OH)₂. "Low-condensed" melamine methylol means a melamine-formaldehyde product that has a limited number of melamine units that are linked together via either methylene linkages or dimethylene ether bridges, wherein the limited number is less than 50. In a preferred embodiment, the melamine methylol aqueous dispersion includes at least about 20 wt %, more preferably at least about 35 wt %, even more preferably at least about 50 wt %, of free and low-condensed melamine methylol on the basis of the total weight of the melamine and formaldehyde used to make the melamine methylol dispersion.

The aqueous dispersion of melamine methylol employed in the invention is prepared by mixing an aqueous solution of formaldehyde, with melamine in an aqueous medium in a suitable reactor, such as a reactor equipped with an agitator and a condenser. The melamine-to-formaldehyde molar ratio of the mixture is in a range of between about 1:1 and 1:3.2 The aqueous solution of formaldehyde has adjusted to a pH of between about 8 and about 10, for example by adding NaOH, and includes equal to or less than about 6 wt % of methanol based on the total weight of the formaldehyde solution. The aqueous medium of melamine has a pH of between about 7.5 and about 10, preferably a pH of between about 8.5 and about 10, more preferably a pH between about 9 and about 10, and even more preferably about pH 9.

Typically, any suitable commercially available melamine and formaldehyde can be used in the invention. For example, commercial grades of melamine and formaldehyde can be used. In one embodiment, the aqueous formaldehyde solution is formalin, and includes about 37.5% by weight formaldehyde. In a preferred embodiment, methanol is added to the formaldehyde solution to stabilize the formaldehyde and avoid the formation of para-formaldehyde. In a particularly preferred embodiment, the amount of methanol in the aqueous solution is in a range of between about 1 wt. % and about 10 wt. % methanol, for example, about 6 wt. %, or about 3 wt. % methanol.

The pH of the mixture of melamine and formaldehyde is adjusted to have a pH of between about 8 and about 10 by addition of any suitable basic solution, such as a solution of NaOH (e.g., 2N NaOH solution). Preferably, the pH of the mixture of melamine and formaldehyde is adjusted to have a pH of between about 8.5 and about 10, such as between about 8.5 and about 9.5 or between about 9 and about 10.

In a specific embodiment, the reaction mixture is then heated to a suitable temperature for a period of time sufficient to cause the melamine to dissolve all or a substantial portion of the added melamine. In one more specific embodiment, the reaction mixture is maintained at a temperature in a range of between about 85° C. and about 95° C. for a period of time, for example, between about three hours and about 10 hours (e.g., between about 4 hours and about 7 hours, or between about 4.5 hours and about 6.75 hours). In another more specific embodiment, the reaction mixture is maintained at a temperature about 90° C. for a period of time, for example, about 6 hours and 45 minutes, to dissolve all or a substantial portion of the added melamine. Preferably, during adjustment of the pH prior to reaction, the temperature of the reaction mixture generally is maintained at a temperature within a range of 1° C.

The melamine methylol has a melamine-to-formaldehyde molar ratio of between about 1:1 and 1:3.2, such as about 1:1.6, about 1:1.7 or about 1:2. In a specific embodiment, the melamine-to-formaldehyde molar ratio of the melamine methylol is in a range of between about 1:1 and about 1:2, more specifically between about 1:1.5 and about 1:2.

The pH of the melamine methylol dispersion is in a range of between about 8 and about 10. Preferably, the pH is in a range of between about 8.0 and about 9. More preferably, the pH is in a range of between about 8.2 and about 8.8. Even more preferably, the pH is about 8.5.

Preferably, the solid content of the melamine methylol dispersion is less than about 65 wt % based on the total weight of the melamine methylol aqueous dispersion. More preferably, the solid content is in a range of between about 30 wt % and about 65 wt %. Even more preferably, the solid content is in a range of between about 45 wt % and about 65 wt %, or of between about 50 wt % and about 60 wt %, such as about 59 wt %.

The viscosity of the melamine methylol aqueous dispersion can be adjusted depending upon particular uses of the dispersion. Preferably, the melamine methylol aqueous dispersion has a viscosity of between about 50 cps and about 800 cps at about 25° C. More preferably, the viscosity is in a range of between about 100 cps and about 500 cps at about 25° C., such as about 300 cps.

In one specific embodiment, the melamine methylol dispersion employed in the invention has a viscosity is about 300 cps, a solid content of about 59% by weight, and a pH of about 8.5.

The curable resin composition of the invention includes the aqueous dispersion of melamine methylol described above and a formaldehyde-based resin. The melamine methylol comprises between about 1 wt % and about 50 wt % of the combined weight of the formaldehyde-based resin and the melamine methylol. The melamine methylol content corresponds to the total amount, in weight, of melamine and formaldehyde that are used for making the melamine methylol aqueous dispersion. In a specific embodiment, the melamine methylol comprises between about 5 wt % and about 30 wt % of the combined weight of the formaldehyde-based resin and the melamine methylol. In another specific embodiment, the melamine methylol comprises between about 5 wt % and about 20 wt % of the combined weight of the formaldehyde-based resin and the melamine methylol. In yet another specific embodiment, the melamine methylol comprises between about 8 wt % and about 13 wt % of the combined weight of the formaldehyde-based resin and the melamine methylol. The features, including preferred features, of the melamine methylol dispersion are as described above.

In one embodiment of the curable resin composition of the invention, the resin composition includes an aqueous dispersion of melamine methylol having a melamine-to-formaldehyde molar equivalent ratio of between about 1:1 and about 1:3.2, preferably between about 1:1 and about 1:2, wherein the aqueous dispersion has a pH in a range of between about 8.2 and about 9. In one specific embodiment, the resin composition includes a formaldehyde-based resin, wherein the melamine methylol comprises between about 1 wt % and about 50 wt % (e.g., between about 10 wt % and about 50 wt % or between about 10 wt % and about 30 wt %, preferably between about 5 wt % and about 20 wt %, between about 5 wt % and about 10 wt %, or between about 8 wt % and about 13 wt %) of the combined weight of the formaldehyde-based resin and the melamine methylol. In a more specific embodiment, the melamine methylol dispersion has a solid content in a range of between 45 wt % and about 65 wt %, and a viscosity of between about 100 cps and about 500 cps at about 25° C. In another specific embodiment, the melamine methylol aqueous dispersion has a solid content in a range of between 45 wt % and about 65 wt %, and a viscosity of between about 250 cps and about 350 cps at about 25° C.

In another embodiment of the curable resin composition of the invention, the resin composition includes an aqueous dispersion of melamine methylol having a melamine-to-formaldehyde molar equivalent ratio of between about 1:1 and about 1:3.2, preferably between about 1:1 and about 1:2, wherein the aqueous dispersion has a pH in a range of between about 8.2 and about 8.8, such as 8.5. In one specific embodiment, the resin composition includes a formaldehyde-based resin, wherein the melamine methylol comprises between about 1 wt % and about 50 wt %, preferably between about 5 wt % and about 20 wt % or between about 5 wt % and about 10 wt %, of the combined weight of the formaldehyde-based resin and the melamine methylol. In a more specific embodiment, the melamine methylol dispersion has a solid content in a range of between about 45 wt % and about 65 wt %, and a viscosity of between about 100 cps and about 500 cps at about 25° C. In another specific embodiment, the melamine methylol dispersion has a solid content in a range of between 45 wt % and about 65 wt %, and a viscosity of between about 250 cps and about 350 cps at about 25° C.

In yet another embodiment of the curable resin composition of the invention, the resin composition includes an aqueous melamine methylol dispersion having a viscosity of between about 250 cps and about 350 cps at about 25° C., a solid content in a range of between about 45 wt % and about 65 wt %, and a pH of between about 8.2 and about 8.8. In one particular embodiment, the melamine methylol comprises between about 10 wt % and about 20 wt % of the total weight of the combined weight of the formaldehyde-based resin and the melamine methylol. In another particular embodiment, the pH of the melamine methylol dispersion is about 8.5. In these embodiments, the melamine-to-formaldehyde molar equivalent ratio is preferably between about 1:1.5 and about 1:2. In these embodiments, the solid content is preferably about 59 wt %.

A "formaldehyde-based resin," as used herein, means a resin product produced from polymerization of formaldehyde with any suitable counter reactant. Examples of suitable counter reactants includes organic molecules having at least one functional groups selected from the group consisting of —OH, —SH and —NH$_2$. Specific examples include phenol compounds having at least one —OH group, and urea. In a preferred embodiment, the formaldehyde-based resin is a phenol-formaldehyde resin or a urea-formaldehyde resin. Any suitable commercially available phenol-formaldehyde resins and urea-formaldehyde resins can be used in the invention.

As used herein, an uncured or uncrosslinked "resin" is a composition for curing or crosslinking, comprising one or more components selected from monomers, oligomers, and polymers, and may optionally contain other additives such as colorants, stabilizers, plasticizers, fillers, solvents, antiloading agents, or the like. Generally, a resin includes a mixture of partially polymerized components that harden upon curing, which is typically the result of a crosslinking reaction. The uncured or uncrosslinked resin can be cured by initiation with light, electron beam radiation, acid, base, heat, combinations thereof.

The curable resin composition of the invention can be used for a resin binder employed in abrasive products, such as bonded abrasive product (e.g., abrasive wheels, disks and horns) and coated abrasive products (e.g., abrasive films and papers). In one embodiment, the abrasive product of the invention includes a plurality of abrasive particles and a resin binder cured from the resin composition described above. The resin composition can be blended with a plurality of abrasive particles or, in the alternative, applied over abrasive particles and then cured to form a make coat or a size coat over a base layer and the plurality of abrasive particles of an abrasive product. After application of the resin composition, either as a bond, a make coat or a size coat, the resin composition is cured under any suitable condition known in the art.

In one embodiment of the abrasive product of the invention, the abrasive product of the invention is a coated abrasive product that includes a base layer, a plurality of abrasive particles, and a resin coat attaching the plurality of abrasive particles to the base layer. The resin coat is cured from a resin composition as described above. Features, including preferred features, of the resin composition are as described above for the curable resin compositions. In another embodiment, the abrasive product of the invention is a bonded abrasive product that includes a plurality of abrasive powders and a resin binder cured from a resin composition as described above. In the bonded abrasive product, the abrasive powders are typically bonded together with the resin binder.

In one specific embodiment of the abrasive product of the invention, the cured resin binder has a formaldehyde emission less than about 300 micrograms/$m^3$ per hour, as determined by the standard climatic chamber test procedure (e.g., "Standard Practice for the Testing of Volatile Organic Emissions from Various Sources Using Small-Scale Environmental Chambers,": dhs.ca.gov/ps/deodc/ehlb/iaq/VOCS/Section_01350_reface.htm) that follows the guidance of ASTM (American Society for Testing and Materials) 5116-97, "Standard Guide for Small-Scale Environmental Chamber Determinations of Organic Emissions for Indoor Materials/Products."

Figure 2:
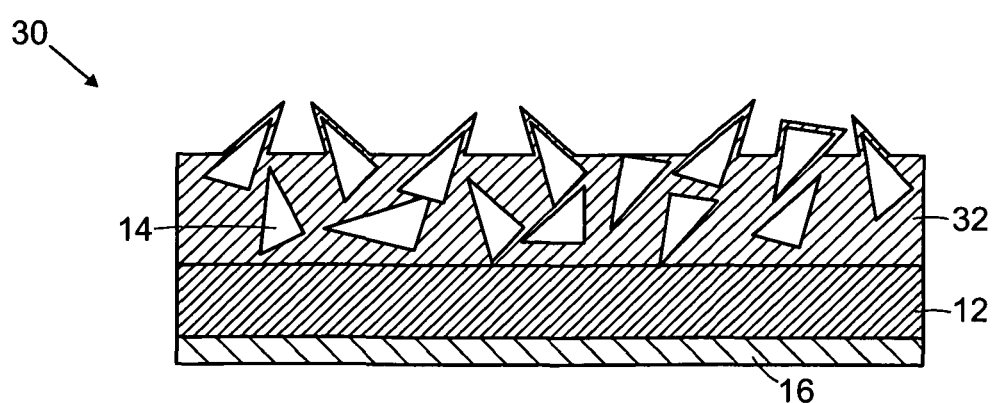
FIG. 2 is a schematic representation of a cross-sectional view of another embodiment of a coated abrasive product of the invention.

The coated abrasive product of the invention generally include a substrate (i.e., base layer), an abrasive particles and at least one binder to hold the abrasive material to the substrate. As used herein, the term "coated abrasive product" encompasses a nonwoven abrasive product. The abrasive material, such as abrasive grains, particles or agglomerate thereof, can be present in one layer (e.g., resin-abrasive layer) or in two layers (e.g., make coat and size coat) of the coated abrasive tools. FIGS. 1 and 2 show coated abrasive products 10 and 30 of the invention. Referring to FIG. 1, in coated abrasive product 10, substrate 12 is treated with optional backsize coat 16 and optional presize coat 18. Overlaying the optional presize coat 18 is make coat 20 to which abrasive material 14, such as abrasive grains or particles, are applied. Size coat 22 is optionally applied over make coat 20 and abrasive particles 14. Overlaying size coat 22 is optional supersize coat 24. Depending upon their specific applications, coated abrasive product 10 may or may not include backsize coat 16 and/or presize coat 18. Also, depending upon their specific applications, coated abrasive product 10 may or may not include size coat 22 and/or supersize coat 24. Shown in FIG. 2 is coated abrasive product 30 that includes a single layer of an abrasive material and adhesive(s) (binder-abrasive layer 32) and optionally backsize coat 16. Optionally, presize coat 18, size coat 22 and supersize coat 24, as shown in FIG. 1, can be included in coated abrasive tools 30.

In some embodiments, a curable resin composition of the invention is used in forming at least one layer selected from the group consisting of binder-abrasive layer 32, backsize coat 16, presize coat 18, make coat 20, size coat 22 and supersize coat 24. In a specific embodiment, a curable resin composition of the invention is used in forming at least one adhesive layer selected from the group consisting of presize coat 18, make coat 20 and size coat 22. In a preferred embodiment, a curable resin composition of the invention is used to form a binder for affixing abrasive particles 14 to substrate 12, for example, for forming binder-abrasive layer 32 or at least one coat of coats 20 (make coat) and 22 (size coat). In a specifically preferred embodiment, a curable resin composition of the invention is used to form a binder for binder-abrasive layer 32. In these embodiments, abrasive particles 14 can be applied separately by gravity, electrostatic deposition or in air stream, or as slurry together with the curable resin composition.

Substrate 12 may be impregnated either with a resin-abrasive slurry or a resin binder without abrasive grains, depending upon the required aggressiveness of the finished coated abrasive tools, as described above. Substrate 12 useful in the invention can be rigid, but generally is flexible. Substrate 12 can be paper, cloth, film, fiber, polymeric materials, nonwoven materials, vulcanized rubber or fiber, etc., or a combination of one or more of these materials, or treated versions thereof. The choice of the substrate material generally depends on the intended application of the coated abrasive tool to be formed. In a preferred embodiment, substrate 12 is a nonwoven material. As used herein, "nonwoven" means a web of random or directional fibers held together mechanically, chemically, or physically, or any combination of these. Examples of nonwoven materials include fibers formed into a nonwoven web that provides as a three-dimensional integrated network structure. Any fibers known to be useful in nonwoven abrasive tools can be employed in the invention. Such fibers are generally formed from various polymers, including polyamides, polyesters, polypropylene, polyethylene and various copolymers thereof. Cotton, wool, blast fibers and various animal hairs can also be used for forming nonwoven fibers. In some applications, the nonwoven substrate can include a collection of loose fibers, to which abrasive particles 14 are added to provide an abrasive web having abrasive particles 14 throughout.

Depending upon which adhesive layer(s) the curable resin composition of the invention is utilized for, abrasive particles 14 are applied over a substrate prior to, after and/or simultaneously with the application of a curable resin composition as described above to the substrate. Abrasive particles 14 can be applied over substrate 12 by spraying (via gravity, electrostatic deposition or air stream) or coating with the curable resin composition. In a specific embodiment, abrasive particles 14 are applied over substrate 12 simultaneously with the curable resin composition. In one example of this embodiment, as shown in FIG. 2, the curable resin composition and abrasive material are mixed together to form a binder-abrasive composition slurry, and the slurry is applied over substrate 12 to form single binder-abrasive composition layer 32. In another specific embodiment, abrasive particles 14 is applied over a substrate coated with the curable resin composition. In one example of this embodiment, the curable resin composition is used for forming at least one of the backsize, presize and make coats. In yet another embodiment, abrasive particles 14 are applied prior to the application of the curable resin composition to substrate 12. In one example of this embodiment, the curable resin composition is used for forming at least one of the size and supersize coats.

Abrasive particle materials 14 useful in the invention can be of any conventional abrasive particle material utilized in the formation of coated abrasive tools. Examples of suitable abrasive particle materials for use in the invention include diamond, corundum, emery, garnet, chert, quartz, sandstone, chalcedony, flint, quartzite, silica, feldspar, pumice and talc, boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride. The abrasive materials can be oriented or can be applied to the substrate without orientation (i.e., randomly), depending upon the particular desired properties of the coated abrasive tools. In choosing an appropriate abrasive material, characteristics, such as size, hardness, compatibility with workpieces and heat conductivity, are generally considered. Abrasive particle materials useful in the invention typically have a particle size ranging from about 0.1 micrometer and about 1,500 micrometers, such as from about 10 micrometers to about 1000 micrometers.

The adhesive layer(s) of coated abrasive tools 10 and 30 can be made by any suitable method generally known in the art. In one embodiment, optional backsize coat 16 and optional presize coat 18, not containing abrasive particles 14, are coated on substrate 12 and cured by exposure to heat in order to impart sufficient strength to substrate 12 for further processing. Then, make coat 20 is applied to substrate 12 to secure abrasive particles 14 throughout substrate 12, and while the coat is still tacky, abrasive particles 14 are applied over make coat 20. The make coat is subsequently cured so as to hold abrasive particles 14 in place. Thereafter, size coat 22 is applied over substrate 12, and then cured. The primary function of size coat 22 generally is to anchor abrasive particles 14 in place and allow them to abrade a workpiece without being pulled from the coated abrasive structure before their grinding capability has been exhausted. In another embodiment, a slurry of abrasive particles 14 and a resin binder composition described above, is applied over substrate 12, optionally on presize coat 18 over substrate 12, and then cured.

In some cases, supersize coat 24 is deposited over size coat 22. Supersize coat 24 can be deposited with or without a binder, as described above. Generally, the function of supersize coat 24 is to place on a surface of coated abrasive materials 14 an additive that provides special characteristics, such as enhanced grinding capability, surface lubrication, anti-static properties or anti-loading properties. Examples of suitable grinding aids include $KBF_4$ and calcium carbonate. Examples of suitable lubricants for supersize coat 24 include lithium stearate. Examples of suitable anti-static agent include alkali metal sulfonates, tertiary amines and the like. Examples of suitable anti-loading agents include metal salts of fatty acids, for example, zinc stearate, calcium stearate and lithium stearate, sodium laurel sulfate and the like. Anionic organic surfactants can also be used effective anti-loading agents. A variety of examples of such anionic surfactants and antiloading compositions including such an anionic surfactant are described in U.S. Patent Application Publication No. 2005/0085167 A1, the entire teachings of which are incorporated herein by reference. Other examples of suitable anti-loading agents include inorganic anti-loading agents, such as metal silicates, silicas, metal carbonates, metal sulfates. Examples of such inorganic anti-loading agents can be found in WO 02/062531, the entire teachings of which are incorporated herein by reference.

In some specific embodiments, the coated abrasive product of the invention includes a nonwoven substrate, such as a nonwoven substrate made from an air-laid process which is well known in the art. The nonwoven substrate is impregnated with a coating composition escribed above, and an abrasive material, such as fine abrasive particles. The uncured, impregnated nonwoven substrate is wound spirally to form a log. Alternatively, the uncured impregnated nonwoven substrate is cut into sheets and the sheets are stacked between two metal plates to form a slab. The log or slab is then heated to form the nonwoven abrasive tool. Optionally, the cured log or slab is converted into a final shape normally used for polishing, deburring, or finishing applications in the metal or wood industries.

The curable resin composition of the invention can optionally further include one or more additives, such as fillers, coupling agents, fibers, lubricants, surfactants, pigments, dyes, wetting agents, grinding aids, anti-loading agents, anti-static agents and suspending agents. Specific additive(s) that is included in the resin composition can be chosen depending upon for which adhesive layer(s) (e.g., coats 16, 18, 20, 22, 24 and 32 of FIGS. 1 and 2) the resin composition is employed.

For example, supersize coat 24 can include one or more anti-loading agents. One or more grinding aids can be included in size coat 22 and/or make coat 20. The amounts of these materials are selected, depending upon desired properties to achieve.

The abrasive product of the invention can generally take the form of sheets, discs, belts, bands, and the like, which can be further adapted to be mounted on pulleys, wheels, or drums. The coated abrasive product of the invention can be used for sanding, grinding or polishing various surfaces of, for example, steel and other metals, wood, wood-like laminates, plastics, fiberglass, leather or ceramics. In one embodiment, the abrasive product of the invention is used for abrading a work surface by applying the abrasive product in an abrading motion to remove a portion of the work surface.

EXEMPLIFICATION

Example 1

Preparation of Aqueous Dispersion of Liquid Melamine Methylol (LMM)

The melamine methylol was made by a batch process in a three necked round bottom flak (reaction kettle) equipped with an agitator and a condenser. Specified amount of melamine and formaldehyde were charged into the flask in the desired molar ratio.

For LMM aqueous dispersion having a melamine-to-formaldehyde molar ratio of 1:1.6 was prepared as follows:

Commercial grades of melamine and formaldehyde were used. A 37.5% aqueous solution of formaldehyde was used. The formaldehyde solution included about 4-6 wt % methanol. The formaldehyde solution was adjusted to have a pH about 9 using a 2N NaOH solution. About 750 g of melamine, and 761.9 g of formaldehyde in a 37.5% formaldehyde solution were added to the reaction kettle. 112.6 mL of water having pH 11 (adjusted with 2 N NaOH) was also added to the reaction kettle to make the reaction mixture at a highly basic medium. The temperature of the reaction mixture was controlled using a water bath. The set temperature of the water bath was varied from 50° C. to 95° C. by step by step by watching the temperature of the reaction kettle. The reactor temperature was maintained at 90° C. for 6 hours and 45 minutes to get melamine dissolved. The formed LMM aqueous dispersion has a viscosity of 300 cps at 25° C., a solid content of 59% and a pH of 8.5. No free formaldehyde was detected from the LMM aqueous dispersion.

LMM aqueous dispersion having a melamine-to-formaldehyde molar ratio of 1:1.7 and 1:2.0 were also prepared using similar process described above for the LMM having a melamine-to-formaldehyde molar ratio of 1:1.6.

Example 2

Cured Urea-Formaldehyde Resin Composition and their Hydrolytic Stability

Urea-formaldehyde (UF) resin and phenol-formaldehyde (PF) resin, which were purchased from West Coast Polymer PVT, Ltd., were used in the example. The specification of the UF and PF resins are as follows:
  Specification of Urea Formaldehyde:
  Appearance: off white syrupy liquid
  % of solid content: 60%-65%
  pH: 7.5-8.5
  Gel time @121° C.: 3.0-6.0 minutes Viscosity: 3000 cps-5000 cps @25° C.

Free formaldehyde: 1.0%-2.0%

Specification of Phenol Formaldehyde

Appearance: Dark reddish viscous liquid

% of solid content: 76-80% pH: 8.5-9

Gel time at 121 (+/−1)° C.: 10-11 minutes

Viscosity: 2,000 cps-20,000 cps @25° C.

Free formaldehyde: 0.1%-5%

LMMs having various molar ratio of melamine and formaldehyde were prepared using the processes described in Example 1. Each of the liquid LMMs was blended with the liquid UF or PF resin by using laboratory stirrer which have a regulator for controlling rpm and it can be varied from 100 rpm-1000 rpm by adjusting regulator. The loading of liquid LMM was based on weight percentage. The mixture was then poured into an aluminum foil for getting thin film and cured at 105° C. for 2 hours. These cured samples were ground to less than 25 mesh by using mortar and pestle and samples were taken for hydrolytic stability study.

Free formaldehyde (HCHO) emission of the samples under a hydrolytic condition at 60° C. for 3 hours were measured. For the free formaldehyde emission tests. freshly cured resins were used. For the tests, a portion of the freshly cured resins (2 gm) was grounded to less than 25 mesh. The grounded resin was suspended in 100-ml distilled water (pH 7) and maintained at 60° C. under continuous stirring in a flask. The suspension was then filtered, and the filtrate was analyzed for formaldehyde by the sulfite procedure. The sulfite procedure was based on chemistry between formaldehyde and $Na_2SO_3$, as shown in the following:

$$Na_2SO_3 + HCOH + H_2O \rightarrow NaOH + NaCH_2SO_3OH.$$

The liberated NaOH was then titrated with 0.1 Normal HCl solution. The results are summarized in Table 1 below.

TABLE 1

Hydrolytic Stability of Cured UF + LMM (various mole ratio's)

| | LMM | | |
|---|---|---|---|
| % of LMM loading % of LMM loading (wt %) | M/F ratio 1:1.6 % of HCHO liberated (w/w) | M/F ratio 1:2.0 % of HCHO liberated (w/w) | M/F ratio 1:1.7 % of HCHO liberated (w/w) |
| 0 | 1.801 | 1.726 | 1.828 |
| 10 | 0.96 | 1.416 | 1.17 |
| 20 | 0.83 | 1.319 | 0.91 |
| 30 | 0.77 | 1.216 | 0.83 |
| 40 | 0.69 | 1.117 | 0.75 |

As shown in Table 1 above, the free formaldehyde liberation decreased with increasing MF methylol loading. Also the reduction of free formaldehyde liberation was generally related to the mole ratio of formaldehyde (F) and melamine (M) of the LMM used for the study. When the F/M became lower the hydrolytic stability of the resulting cured UF resin got improved. This may be, at least in part, the LMM having a relatively lower F/M mole ratio can quench any available formaldehyde in UF resin having a relatively higher F/M ratio. The condensation of the LMM with formaldehyde in the UF resin can provide hydrolytically stable structure to the UF resin.

Example 3

Abrasive Products Employing Resin Binder Cured from the Liquid LMM

Coated abrasive products employing a make coat and a size coat were prepared. The make coat and size coat formulations included liquid melamine methylol (LMM) having a F/M molar ratio of 1:1.6, which was prepared as described in Example 1. The formulations further included a commercially available UF resin (West Coast Polymer PVT, Ltd.), and the amount of the LMM was 10 wt % of the combined weight of the UF resin and the LMM:

Make Coat Formulation

Urea formaldehyde: 3491 gm

Melamine methylol: 349 gm

Snow-white filler (Calcium sulphate or Gypsum): 872.96 gm

Acid catalyst: 118.723 gm (25% soln)

Buffer solution: 17.45 gm

Silane: 17.45 gm

Wetting agent: 22 gm

Size Coat

Urea formaldehyde: 3498.5 gm

Melamine methylol: 349.85 gm

Snow-white filler (Calcium sulphate or Gypsum): 874.64 gm

Acid Catalyst: 111.956 gm (25% soln)

Buffer Solution: 26.24 gm

Silane: 17.49 gm

Defoamer: 6.9 gm

The above make formulation was coated on Awt paper. After application of abrasive particles (aluminum oxide grains, grit size: 80#) onto the make coat, the make coat was cured stepwise at 60° C. for ½ hours, at 70° C. for about ½ hours and at 95° C. for about ½ hours. After curing the make coat, the size coat was applied over the abrasive particles, and then cured at 75° C. for about 10 minutes and at 65° C. for about 40 minutes. The cured sample was undergone post curing at 60° C. for about 8 hours.

Another sample employing a UF resin and 20 wt % of LMM was prepared using similar procedures to those for the sample employing 10 wt % LMM. A control sample employing only the UF resin was also prepared similarly.

Formaldehyde emission of the samples was measures using the standard climatic chamber test procedure (e.g., "Standard Practice for the Testing of Volatile Organic Emissions from Various Sources Using Small-Scale Environmental Chambers,": dhs.ca.gov/ps/deodc/ehlb/iaq/VOCS/Section_01350_reface.htm) that follows the guidance of ASTM (American Society for Testing and Materials) 5116-97, "Standard Guide for Small-Scale Environmental Chamber Determinations of Organic Emissions form Indoor Materials/Products." The results are summarized in Table 2 below. As shown in Table 2, formaldehyde emission in the samples of the invention, employing LMM (Control A+10 wt % LMM and Control A+20 wt % LMM) was substantially lower than that in the control sample (Control A) that did not employ the LMM.

TABLE 2

| Sample Description | Sample Time (hrs) | μg Formaldehyde/m² * hr | | | | |
| --- | --- | --- | --- | --- | --- | --- |
| | | A | B | C | Mean | SD |
| Control A | 4 | 729 | 465 | 513 | 570 | 140 |
| | 8 | 630 | 432 | 408 | 490 | 120 |
| | 24 | 261 | 187 | 260 | 240 | 40 |
| Control A + 10% LMM | 4 | 277 | 175 | — | 230 | — |
| | 8 | 254 | 139 | — | 200 | — |
| | 24 | 101 | 89 | — | 100 | — |
| Control A + 20% LMM | 4 | 207 | 151 | 143 | 170 | 40 |
| | 8 | 181 | 125 | 117 | 140 | 40 |
| | 24 | 70 | 76 | 80 | 80 | 5 |

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. An abrasive product comprising:
   a) a plurality of abrasive particles; and
   b) a resin binder cured from a resin composition that includes:
      i) an aqueous dispersion of melamine methylol having a melamine-to-formaldehyde molar equivalent ratio of less than 1:2 and greater than about 1:1, the aqueous dispersion having a pH in a range of between about 8 and about 10; and
      ii) a formaldehyde-based resin; wherein the melamine methylol comprises between about 1 wt % and about 50 wt % of the combined weight of the formaldehyde-based resin and the melamine methylol, wherein the cured resin binder has a free formaldehyde emission of less than about 300 micrograms/m³ per hour.

2. The abrasive product of claim 1, wherein the melamine methylol dispersion has a pH of between about 8.0 and about 9.

3. The abrasive product of claim 2, wherein the melamine methylol dispersion has a pH of between about 8.2 and about 8.8.

4. The abrasive product of claim 3, wherein the melamine methylol dispersion has a pH of about 8.5.

5. The abrasive product of claim 1, wherein the melamine methylol comprises between about 5 wt % and about 20 wt % of the combined weight of the formaldehyde-based resin and the melamine methylol.

6. The abrasive product of claim 5, wherein the melamine methylol comprises between about 8 wt % and about 13 wt % of the combined weight of the formaldehyde-based resin and the melamine methylol.

7. The abrasive product of claim 1, wherein the melamine methylol has a melamine-to-formaldehyde molar equivalent ratio of greater than about 1:1.5 and less than 1:2.

8. The abrasive product of claim 1, wherein the melamine methylol dispersion has a solid content less than about 65 wt % based on the total weight of the melamine methylol dispersion.

9. The abrasive product of claim 8, wherein the solid content is in a range of between about 30 wt % and about 65 wt %.

10. The abrasive product of claim 9, wherein the solid content is in a range of between about 45 wt % and about 65 wt %.

11. The abrasive product of claim 10, wherein the solid content is in a range of between about 50 wt % and 60 wt %.

12. The abrasive product of claim 1, wherein the melamine methylol dispersion has a viscosity of between about 50 cps and about 800 cps at about 25° C.

13. The abrasive product of claim 12, wherein the melamine methylol dispersion has a viscosity of between about 100 cps and about 500 cps at about 25° C.

14. The abrasive product of claim 1, wherein the formaldehyde-based resin is a urea-formaldehyde resin or a phenol-formaldehyde resin.

15. The abrasive product of claim 14, wherein the aqueous dispersion of melamine methylol has a pH in a range of about 8.2 and about 8.8, a solid content in a range of between about 45 wt % and about 65 wt %, and a viscosity of between about 100 cps and about 500 cps at about 25° C., and wherein the melamine methylol comprises between about 5 wt % and about 20 wt % of the combined 10 weight of the formaldehyde-based resin and the melamine methylol.

16. The abrasive product of claim 1, wherein the abrasive product is a coated abrasive product.

17. The abrasive product of claim 16, further comprising a base layer, to which the plurality of abrasive particles are attached by the resin binder.

18. The abrasive product of claim 17, further including a make coat and/or size coat, wherein the resin binder is included in at least one of the make coat and the size coat.

19. The abrasive product of claim 1, wherein the abrasive product is a bonded abrasive product.

20. A method of preparing an abrasive product, comprising:
   a) contacting a plurality of abrasive particles with a curable resin composition that includes:
      i) an aqueous dispersion of melamine methylol having a melamine-to-formaldehyde molar equivalent ratio of less than 1:2 and greater than about 1:1, the aqueous dispersion having a pH in a range of between about 8 and about 10; and
      ii) a urea-formaldehyde resin or a phenol-formaldehyde resin, wherein the melamine methylol comprises between about 1 wt % and about 50 wt % of the combined weight of the formaldehyde-based resin and the melamine methylol; and
   b) curing the curable composition to produce the abrasive product, wherein the cured resin binder has a free formaldehyde emission of less than about 300 micrograms/m³ per hour.

21. The method of claim 20, further including the step of preparing the aqueous dispersion of melamine methylol, which includes mixing an aqueous solution of formaldehyde, having a pH of between about 8 and about 10, with melamine in an aqueous medium having a pH of between about 7.5 and about 10, and adjusting pH of the formaldehyde and melamine mixture to have a pH of between about 8 and about 10, wherein the formaldehyde solution includes equal to or less than about 6 wt % of methanol based on the total weight of the formaldehyde solution, and wherein the formaldehyde and melamine are mixed in a melamine-to-formaldehyde molar ratio of less than 1:2 and greater than about 1:1.

22. The method of claim 21, wherein the aqueous solution of formaldehyde has a pH about 9.

23. A method of abrading a work surface, comprising applying an abrasive product to a work surface in an abrading motion to remove a portion of the work surface, the abrasive product including:
   a) a plurality of abrasive particles; and b) a resin binder cured from a resin composition that includes: i) an aqueous dispersion of melamine methylol having a melamine-to-formaldehyde molar equivalent ratio of less than 1:2 and greater than about 1:1, the aqueous dispersion having a pH in a range of between about 8 and about 10; and ii) a formaldehyde-based resin, wherein the melamine methylol comprises between about 1 wt % and about 50 wt % of the combined weight of the formaldehyde-based resin and the melamine methylol, wherein the cured resin binder has a free formaldehyde emission of less than about 300 micrograms/m3 per hour.

24. The method of claim 23, wherein the abrasive product further includes a base layer, to which the plurality of abrasive particles are attached by the resin binder.

25. The method of claim 23, wherein the formaldehyde-based resin is a urea formaldehyde resin or a phenol-formaldehyde resin.

26. The abrasive product of claim 1, wherein the cured resin binder has a free formaldehyde emission of less than about 300 micrograms/m$^3$ per hour as measured at 4 hours using the standard test procedure set forth in ASTM 5117.

27. The abrasive product of claim 26, wherein the melamine methylol comprises between at least 10% of the combined weight of the formaldehyde-based resin and the melamine methylol.

* * * * *